US011084956B2

(12) United States Patent
Hu et al.

(10) Patent No.: US 11,084,956 B2
(45) Date of Patent: Aug. 10, 2021

(54) ELECTRICALLY CONDUCTIVE PARTICLE AND MANUFACTURING METHOD THEREOF, AND ELECTRICALLY CONDUCTIVE ADHESIVE AND MANUFACTURING METHOD THEREOF

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Haifeng Hu, Beijing (CN); Taofeng Xie, Beijing (CN); Ting Zeng, Beijing (CN); Liang Yan, Beijing (CN)

(73) Assignees: BOE TECHNOLOGY GROUP CO., LTD., Beijing (CN); HEFEI XINSHENG OPTOELECTRONICS TECHNOLOGY CO., LTD, Hefei (CN)

(*) Notice: Subject to any disclaimer, the term of this patent is extended or adjusted under 35 U.S.C. 154(b) by 95 days.

(21) Appl. No.: 15/577,205

(22) PCT Filed: Apr. 28, 2017

(86) PCT No.: PCT/CN2017/082422
§ 371 (c)(1),
(2) Date: Oct. 12, 2018

(87) PCT Pub. No.: WO2017/206645
PCT Pub. Date: Dec. 7, 2017

(65) Prior Publication Data
US 2019/0382627 A1 Dec. 19, 2019

(30) Foreign Application Priority Data

May 31, 2016 (CN) .......................... 201610371467.6

(51) Int. Cl.
| | | |
|---|---|---|
| H01B 1/02 | (2006.01) | |
| H01B 1/04 | (2006.01) | |
| C08J 3/12 | (2006.01) | |
| C09J 9/02 | (2006.01) | |
| H01B 1/12 | (2006.01) | |
| H01B 5/14 | (2006.01) | |
| H01B 13/00 | (2006.01) | |

(52) U.S. Cl.
CPC .................. *C09J 9/02* (2013.01); *H01B 1/02* (2013.01); *H01B 1/04* (2013.01); *H01B 1/128* (2013.01); *H01B 5/14* (2013.01); *H01B 13/0036* (2013.01)

(58) Field of Classification Search
CPC ... H01B 1/02; H01B 1/04; H01B 1/20; H01B 1/24; H01B 1/22; C08J 3/128; C08J 3/12; C08J 3/126; C08K 3/042
See application file for complete search history.

(56) References Cited

U.S. PATENT DOCUMENTS

| | | |
|---|---|---|
| 2010/0247892 A1 | 9/2010 | Lee et al. |
| 2016/0280968 A1 | 9/2016 | Lee et al. |
| 2017/0088752 A1 | 3/2017 | Xu |

FOREIGN PATENT DOCUMENTS

| | | | |
|---|---|---|---|
| CN | 104130735 A | | 11/2014 |
| CN | 104485157 A | | 4/2015 |
| CN | 104844822 A | | 8/2015 |
| CN | 105139920 A | | 12/2015 |
| CN | 106128562 A | | 11/2016 |
| KR | 20070092885 A | | 9/2007 |
| KR | 10-1018334 B1 | | 3/2011 |
| KR | 20160029369 A | * | 3/2016 |

OTHER PUBLICATIONS

B. Zhao et al. / Journal of Power Sources 298 (2015) 83-91.*
First Office Action for CN Application No. 201610371467.6, dated Apr. 18, 2017 (with English translation, 5 pages).
Notification to Grant Right for CN Application No. 201610371467.6, dated Jun. 29, 2017 (with English translation, 7 pages).
International Search Report and Written Opinion for PCT Application No. PCT/CN2017/082422, dated Jul. 28, 2017 (with English translation, 26 pages).

* cited by examiner

*Primary Examiner* — Haidung D Nguyen
(74) *Attorney, Agent, or Firm* — Dinsmore & Shohl LLP

(57) ABSTRACT

Embodiments of the present disclosure relate to an electrically conductive particle and a manufacturing method thereof as well as an electrically conductive adhesive comprising the electrically conductive particle and a manufacturing method thereof. The electrically conductive particle comprises: a core microsphere; an electrically conductive macromolecular layer encapsulating the core microsphere; and a 3D graphene layer and a metal layer encapsulating the electrically conductive macromolecular layer.

20 Claims, 2 Drawing Sheets

ELECTRICALLY CONDUCTIVE PARTICLE AND MANUFACTURING METHOD THEREOF, AND ELECTRICALLY CONDUCTIVE ADHESIVE AND MANUFACTURING METHOD THEREOF

CROSS REFERENCE TO RELATED APPLICATIONS

The present application is a U.S. National Stage under 35 U.S.C. § 371 of International Application No. PCT/CN2017/082422, filed on Apr. 28, 2017, which claims priority to and the benefit of Chinese Application No. 201610371467.6 filed on May 31, 2016 and entitled "ELECTRICALLY CONDUCTIVE PARTICLE AND MANUFACTURING METHOD THEREOF, AND ELECTRICALLY CONDUCTIVE ADHESIVE AND MANUFACTURING METHOD THEREOF", the disclosure of which is hereby incorporated by reference in its entirety.

TECHNICAL FIELD

Embodiments of the present disclosure relate to an electrically conductive particle and a manufacturing method thereof as well as an electrically conductive adhesive comprising the electrically conductive particle and a manufacturing method thereof.

BACKGROUND

At present, electrically conductive adhesives are widely used in the field of electronic packaging. The electrically conductive adhesive mainly comprises electrically conductive particles and an insulative adhesive material. The electrically conductive particle is a key component that serves for conduction in the electrically conductive adhesive. There are mainly two kinds of materials for the electrically conductive particle, namely, metal powders, and macromolecular microspheres with metal coated on the surface.

SUMMARY

Embodiments of the present disclosure relate to an electrically conductive particle and a manufacturing method thereof as well as an electrically conductive adhesive comprising the electrically conductive particle and a manufacturing method thereof.

According to a first aspect of the examples of the present disclosure, an electrically conductive particle is provided, which comprises: a core microsphere; an electrically conductive macromolecular layer encapsulating the core microsphere; and a 3D graphene layer and a metal layer, encapsulating the electrically conductive macromolecular layer.

According to this aspect, the surface of the core microsphere of the electrically conductive particle is encapsulated with an electrically conductive macromolecular layer, and the surface of the electrically conductive macromolecular layer is encapsulated with a 3D graphene layer and a metal layer. Since a 3D graphene layer has a very high compression strength and an electrically conductive macromolecular layer has a high electrical conductivity, the compression strength of the electrically conductive particle can be enhanced while the electrical conductivity of the electrically conductive particle can be maintained. Hence, it is ensured that the electrically conductive adhesive can be used within a wider range of pressure, and the time cost by unit product can be reduced, thereby reducing the cost and enhancing the capacity.

According to an illustrative embodiment of the present disclosure, the 3D graphene layer encapsulates the electrically conductive macromolecular layer, and the metal layer encapsulates the 3D graphene layer. According to the embodiment, by encapsulating the surface of the core microsphere with the electrically conductive macromolecular layer, encapsulating the surface of the electrically conductive macromolecular layer with the 3D graphene layer, and encapsulating the surface of the 3D graphene layer with the metal layer, i.e., by adding the electrically conductive macromolecular layer and the 3D graphene layer between the core microsphere and the metal layer, the compression strength of the electrically conductive particle can be enhanced and the electrical conductivity of the electrically conductive particle is maintained, thereby ensuring that the electrically conductive adhesive can be used within a wider range of pressure.

According to another illustrative embodiment of the present disclosure, the metal layer encapsulates the electrically conductive macromolecular layer, and the 3D graphene layer encapsulates the metal layer. According to the embodiment, by encapsulating the surface of the core microsphere with the electrically conductive macromolecular layer, encapsulating the surface of the electrically conductive macromolecular layer with the metal layer, and encapsulating the surface of the metal layer with the 3D graphene layer, the compression strength of the electrically conductive particle can be enhanced and the electrical conductivity of the electrically conductive particle is maintained, thereby ensuring that the electrically conductive adhesive can be used within a wider range of pressure.

According to an illustrative embodiment of the present disclosure, the core microsphere is a monodisperse polystyrene microsphere. According to this illustrative embodiment, since polystyrene is characterized with its lightness and controllable particle diameter, the resultant electrically conductive particle and electrically conductive adhesive are also advantageous for lightness and controllable particle diameters. Moreover, a polystyrene microsphere is easy to obtain, so that the product cost can be reduced.

According to an illustrative embodiment of the present disclosure, the electrically conductive macromolecular layer is a polyaniline layer. According to this illustrative embodiment, since polyaniline is characterized with its high electrical conductivity and simple synthesis, the finally formed electrically conductive particle can maintain a high conductivity even under a high compression stress, and the production cost can be reduced.

According to an illustrative embodiment of the present disclosure, the metal layer is a gold layer. According to this illustrative embodiment, gold is used as the material for the metal layer. Even if the gold layer has a very small thickness, it can still ensure electrical conductivity of the electrically conductive particle.

According to an illustrative embodiment of the present disclosure, the core microsphere has an average diameter of 0.1 μm to 10 μm. According to this illustrative embodiment, the use of a core microsphere having an average diameter falling into the range for manufacturing the electrically conductive particle and electrically conductive adhesive can enable the formed electrically conductive particle and electrically conductive adhesive to have a better electrical conductivity and avoid aggregation of the core microsphere such that the electrically conductive macromolecular layer can fully encapsulate the core microsphere.

According to a second aspect of the embodiments of the present disclosure, there is provided a method for manufacturing an electrically conductive particle, which comprises:

encapsulating a surface of a core microsphere with an electrically conductive macromolecular layer to obtain a composite microsphere; and encapsulating the surface of the composite microsphere with a 3D graphene layer and a metal layer.

According to this aspect, the surface of the core microsphere of the electrically conductive particle is encapsulated with an electrically conductive macromolecular layer, and the surface of the electrically conductive macromolecular layer is encapsulated with a 3D graphene layer and a metal layer. Since a 3D graphene layer has a very high compression strength and an electrically conductive macromolecular layer has a high electrical conductivity, the compression strength of the electrically conductive particle can be enhanced while the electrical conductivity of the electrically conductive particle can be maintained. Hence, it is ensured that the electrically conductive adhesive can be used within a wider range of pressure, and the time cost by unit product can be reduced, thereby reducing the cost and enhancing the capacity.

According to an illustrative embodiment of the present disclosure, encapsulating the surface of the core microsphere with the electrically conductive macromolecular layer comprises treating the core microsphere with a surfactant; and polymerizing electrically conductive monomers on the surface of the core microsphere via initiators to form an electrically conductive macromolecular layer.

According to the embodiment, a macromolecular layer with a high electrical conductivity can be formed simply and efficiently on the surface of the core microsphere. In this case, the finally formed electrically conductive particle can maintain a high electrical conductivity even under a high compression stress, and the production cost can be reduced.

According to an illustrative embodiment of the present disclosure, encapsulating the surface of the composite microsphere with the 3D graphene layer and the metal layer comprises: encapsulating the surface of the composite microsphere with the 3D graphene layer; and encapsulating the surface of the 3D graphene layer with the metal layer.

According to the example, by encapsulating the surface of the core microsphere with the electrically conductive macromolecular layer, encapsulating the surface of the electrically conductive macromolecular layer with the 3D graphene layer, and encapsulating the surface of the 3D graphene with the metal layer, i.e., by adding the electrically conductive macromolecular layer and the 3D graphene layer between the core microsphere and the metal layer, the compression strength of the electrically conductive particle can be enhanced and the electrical conductivity of the electrically conductive particle is maintained, thereby ensuring that the electrically conductive adhesive can be used within a wider range of pressure.

According to an illustrative embodiment of the present disclosure, encapsulating the surface of the composite microsphere with the 3D graphene layer comprises: encapsulating a porous $SiO_2$ surface with the graphene layer, and then performing HF wet etching to obtain 3D graphene powders; and dispersing the 3D graphene powders, and adding the composite microsphere to the dispersed 3D graphene powders to obtain a composite microsphere encapsulated with a 3D graphene layer.

According to the embodiment, mature micro-processing is used to conveniently and easily form the 3D graphene layer, thereby reducing the cost of the electrically conductive particle.

According to an illustrative embodiment of the present disclosure, encapsulating the surface of the 3D graphene layer with the metal layer comprises: placing the composite microsphere encapsulated by the 3D graphene layer into a metal layer-forming solution, and under an electrochemical action, forming a metal layer on the surface of the composite microsphere encapsulated by the 3D graphene layer to obtain the electrically conductive particle.

According to the embodiment, by forming a metal layer on the surface of the composite microsphere encapsulated with the 3D graphene layer, the electrical conductivity of the electrically conductive particle can be enhanced.

According to another illustrative embodiment of the present disclosure, encapsulating the surface of the composite microsphere with the 3D graphene layer and the metal layer comprises: encapsulating the surface of the composite microsphere with a metal layer; and encapsulating the surface of the metal layer with the 3D graphene layer.

According to the embodiment, by encapsulating the surface of the core microsphere with the electrically conductive macromolecular layer, encapsulating the surface of the electrically conductive macromolecular layer with the metal layer, and encapsulating the surface of the metal layer with the 3D graphene layer, the compression strength of the electrically conductive particle can be enhanced and the electrical conductivity of the electrically conductive particle is maintained, thereby ensuring that the electrically conductive adhesive can be used within a wider range of pressure.

According to an illustrative embodiment of the present disclosure, encapsulating the surface of the composite microsphere with the metal layer comprises: placing the composite microsphere into a metal layer-forming solution, and under an electrochemical action, forming a metal layer on the surface of the composite microsphere, thereby obtaining a composite microsphere encapsulated with a metal layer.

According to the embodiment, by forming a metal layer on the surface of the composite microsphere, the electrical conductivity of the electrically conductive particle can be enhanced.

According to an illustrative embodiment of the present disclosure, encapsulating the surface of the metal layer with the 3D graphene layer comprises: encapsulating a porous $SiO_2$ surface with the graphene layer, and then performing HF wet etching to obtain 3D graphene powders; and dispersing the 3D graphene powders, and adding the composite microsphere encapsulated with the metal layer to the dispersed 3D graphene powders to thereby obtain the electrically conductive particle.

According to the example, mature micro-processing is used to conveniently and easily form the 3D graphene layer, thereby reducing the cost by the electrically conductive particle.

According to an illustrative embodiment of the present disclosure, the core microsphere is a monodisperse polystyrene microsphere. According to this illustrative embodiment, since polystyrene is characterized with its lightness and controllable particle diameter, the resultant electrically conductive particle and electrically conductive adhesive are also advantageous for lightness and controllable particle diameters. Moreover, a polystyrene microsphere is easy to obtain, so that the product cost can be reduced.

According to an illustrative embodiment of the present disclosure, the electrically conductive macromolecular layer is a polyaniline layer. According to this illustrative embodiment, since polyaniline is characterized with its high conductivity and simple synthesis, the finally formed electrically conductive particle can maintain a high electrical conductivity even under a high compression stress, and the production cost can be reduced.

According to an illustrative embodiment of the present disclosure, the metal layer is a gold layer. According to this illustrative embodiment, gold is used as the material for the metal layer. Even if the gold layer has a very small thickness, it can still ensure electrical conductivity of the electrically conductive particle.

According to an illustrative embodiment of the present disclosure, the core microsphere has an average diameter of 0.1 μm to 10 μm. According to this illustrative embodiment, the use of a core microsphere having an average diameter falling into the range for manufacturing the electrically conductive particle and electrically conductive adhesive can enable the formed electrically conductive particle and electrically conductive adhesive to have a better electrical conductivity and avoid aggregation of the core microsphere such that the electrically conductive macromolecular layer can fully encapsulate the core microsphere.

According to an illustrative embodiment of the present disclosure, the surfactant is an amphoteric coupling agent, including but being not limited to a chromium complex coupling agent, a silane coupling agent, a titanate coupling agent and a zirconium-containing coupling agent.

According to a third aspect of the present disclosure, there is provided an electrically conductive adhesive, which comprises the electrically conductive particle according to the first aspect.

According to this aspect, since the electrically conductive adhesive comprises the electrically conductive particle according to the first aspect that can maintain its electrical conductivity with enhanced compression strength, the electrically conductive adhesive can be used within a wider range of pressure, and the cost can be reduced and the capacity can be enhanced.

According to a fourth aspect of the present disclosure, there is provided a method for manufacturing an electrically conductive adhesive, which comprises uniformly distributing electrically conductive particles according to the first aspect in an insulative adhesive material.

According to this aspect, the electrically conductive adhesive is manufactured by uniformly distributing electrically conductive particles according to the first aspect in the insulative adhesive material. Since the electrically conductive particle therein can maintain its electrical conductivity with enhanced compression strength, an electrically conductive adhesive that can be used within a wider range of pressure can be provided, and the cost can be reduced and the capacity can be enhanced.

According to the above technical solutions, in the embodiments of the present disclosure, the surface of the core microsphere is encapsulated with an electrically conductive macromolecular layer, and the surface of the electrically conductive macromolecular layer is encapsulated with a 3D graphene layer and a metal layer, thereby forming an electrically conductive particle, and further, the electrically conductive particle is used to form an electrically conductive adhesive. Since a 3D graphene layer has a very high compression strength and an electrically conductive macromolecular layer has a high electrical conductivity, the compression strength of the electrically conductive particle can be enhanced while the electrical conductivity of the electrically conductive particle can be maintained. Hence, it is ensured that the electrically conductive adhesive can be used within a wider range of pressure, and the time cost by unit product can be reduced, thereby reducing the cost and enhancing the capacity.

BRIEF DESCRIPTION OF THE DRAWINGS

In order to illustrate the technical solutions in the embodiments of the present disclosure more clearly, the figures need to be used in the examples are simply introduced below. Apparently, the figures described below only relate to some embodiments of the present disclosure, but shall not limit the present disclosure.

DETAILED DESCRIPTION

In order to make the objective, technical solutions and advantages of the examples of the present disclosure more clearly, the technical solutions in the embodiments of the present disclosure are described below in combination with the drawings in the embodiments of the present disclosure in a clear and complete manner. Apparently, the embodiments as described are a portion instead of all of the embodiments of the present disclosure. All other embodiments that are obtainable to those skilled in the art based on the embodiments of the present disclosure without any creative effort are included in the protection scope of the present disclosure.

At present, in use of the electrically conductive adhesive, due to compression strength, the electrically conductive particles may be broken, which would result in problems of scratches and malfunction of the product. Where the electrically conductive adhesive is an anisotropic conductive film, a problem of losing the anisotropic conductivity may be caused. In this case, the electrically conductive particle needs to be repaired. However, repair of electrically conductive particles has little success rate, which results in increase in working hours for the product, affecting yield of the product and increasing costs by unit product. In order to reduce the costs by unit product and further expand the range of application of the electrically conductive adhesive, there is a desire in the convention technologies for electrically conductive particles and electrically conductive adhesives with higher compression strength.

Embodiments of the present disclosure relate to a electrically conductive particle and a manufacturing method thereof as well as an electrically conductive adhesive comprising the electrically conductive particle and a manufacturing method thereof, which can maintain the electrical conductivity of the electrically conductive particles while improving the compression strength thereof. The structure of this novel electrically conductive particle can ensure application of the electrically conductive adhesive within a wider range of pressure, such that the electrically conductive adhesive has a wider application range. Moreover, the time cost by unit product can be reduced, thereby reducing the cost and enhancing the capacity According to an illustrative embodiment of the present disclosure, a novel electrically conductive particle is provided. The novel electrically conductive particle comprises: a core microsphere, an electrically conductive macromolecular layer encapsulating the core microsphere, and a 3D graphene layer and a metal layer encapsulating the electrically conductive macromolecular layer.

Figure 1A:
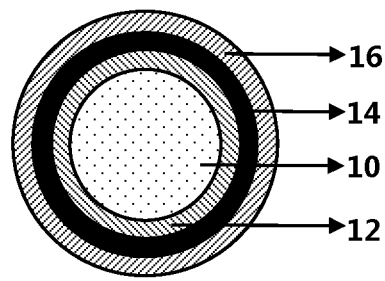
FIG. 1A is a sectional view of an electrically conductive particle according to an illustrative embodiment of the present disclosure.

FIG. 1A is a sectional view of an electrically conductive particle according to an illustrative embodiment of the present disclosure. As shown in FIG. 1A, the electrically conductive particle comprises: a core microsphere 10, an electrically conductive macromolecular layer 12 encapsulating the core microsphere 10, a 3D graphene layer 14 encapsulating the electrically conductive macromolecular layer 12, and a metal layer 16 encapsulating the 3D graphene layer 14.

Figure 1B:
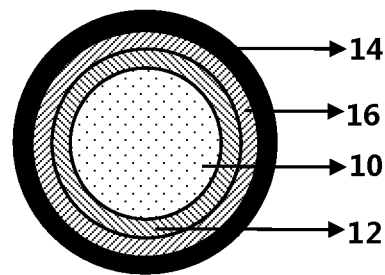
FIG. 1B is a sectional view of an electrically conductive particle according to another illustrative embodiment of the present disclosure.

FIG. 1B is a sectional view of an electrically conductive particle according to another illustrative embodiment of the present disclosure. As shown in FIG. 1B, the electrically conductive particle comprises: a core microsphere 10, an electrically conductive macromolecular layer 12 encapsulating the core microsphere 10, a metal layer 16 encapsulating the electrically conductive macromolecular layer 12, and a 3D graphene layer 14 encapsulating the metal layer 16.

As the core microsphere 10, a micron- or nano-microsphere made of a macromolecular material such as polyvinyl chloride, polystyrene or the like or an inorganic material such as $SiO_2$, $TiO_2$ or the like may be used. Among these materials, a monodisperse polystyrene microsphere is preferred. Since polystyrene is characterized with its lightness and controllable particle diameter, the resultant electrically conductive particle and electrically conductive adhesive are also advantageous for lightness and controllable particle diameters. Moreover, a polystyrene microsphere is easy to obtain, so that the product cost can be reduced.

There is no special limitation on the diameter of the core microsphere 10. The electrical conductivity of an electrically conductive adhesive depends on the conductivity of its electrically conductive particles. Under the premise of ensuring electrical conductivity, the smaller the particle diameter of the electrically conductive particles, the better the electrical conductivity of the formed electrically conductive adhesive. Preferably, the core microsphere 10 as a basic structure for forming the electrically conductive particle has an average diameter of less than or equal to 10 μm. On the other hand, if the diameter of the core microsphere 10 is too small, aggregation of the core microspheres 10 may take place. In order to avoid aggregation of core microspheres 10 so that the electrically conductive macromolecular layer 12 can fully encapsulate the core microsphere 10, preferably, the core microsphere has an average diameter of greater than or equal to 0.1 μm.

The electrically conductive macromolecular layer 12 may be made of an electrically conductive macromolecular material such as polypyrrole, poly-p-phenylene, polyphenylene sulfide, polyaniline and the like. Preferably, polyaniline is used as the material for the electrically conductive macromolecular layer 12 for its simple synthesis, low cost and high electrical conductivity.

There is no special limitation on the thickness of the electrically conductive macromolecular layer 12. For example, the electrically conductive macromolecular layer 12 may have a thickness of 100 to 500 nm.

There is no special limitation on the thickness of the 3D graphene layer 14. For example, the 3D graphene layer 14 may have a thickness of 50 to 200 nm.

The metal layer 16 may be made of a metal material such as gold, silver, copper and the like or other alloy materials. Preferably, gold is used as the material for the metal layer 16. Even if the gold layer has a very small thickness, it can still ensure electrical conductivity of the electrically conductive particle.

There is no special limitation on the thickness of the metal layer 16. For example, the metal layer 16 may have a thickness of 10 to 100 nm.

According to an illustrative embodiment of the present disclosure, there is also provided a method for manufacturing an electrically conductive particle. The method comprises: encapsulating a surface of a core microsphere with an electrically conductive macromolecular layer to obtain a composite microsphere; and encapsulating the surface of the composite microsphere with a 3D graphene layer and a metal layer.

According to an illustrative embodiment, encapsulating the surface of the composite microsphere with the 3D graphene layer and the metal layer comprises: encapsulating the surface of the composite microsphere with the 3D graphene layer and encapsulating the surface of the 3D graphene layer with the metal layer to obtain an electrically conductive particle as shown in FIG. 1A.

According to another illustrative embodiment, encapsulating the surface of the composite microsphere with the 3D graphene layer and the metal layer comprises: encapsulating the surface of the composite microsphere with the metal layer and encapsulating the surface of the metal layer with the 3D graphene layer to obtain an electrically conductive particle as shown in FIG. 1B.

Figure 2A:
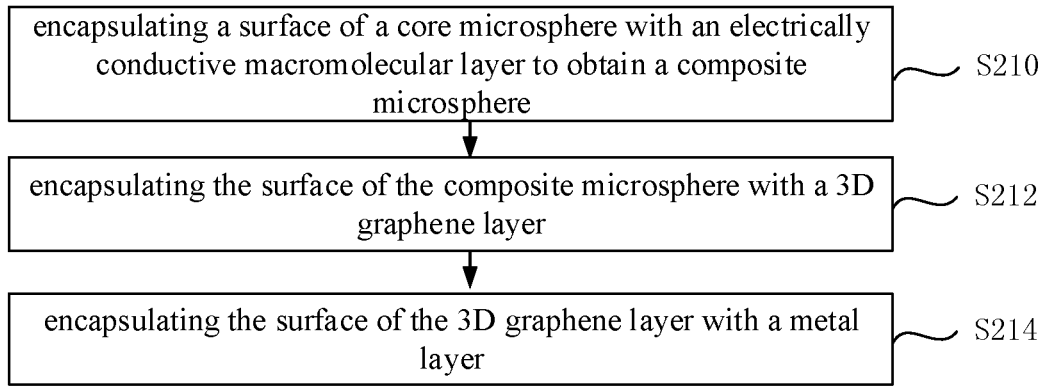
FIG. 2A is a flow chart for manufacturing the electrically conductive particle as shown FIG. 1A according to an illustrative embodiment of the present disclosure.

FIG. 2A is a flow chart for manufacturing the electrically conductive particle as shown in FIG. 1A according to an illustrative embodiment of the present disclosure.

As shown in FIG. 2A, firstly, in step S210, the surface of the core microsphere 10 is encapsulated with the electrically conductive macromolecular layer 12. For example, this step may specifically comprise: treating the core microsphere 10 with a surfactant, and polymerizing electrically conductive monomers on the surface of the core microsphere via initiators to form the electrically conductive macromolecular layer 12, thereby obtaining the composite microsphere.

The surfactant as used here may be an amphoteric coupling agent, including but being not limited to a chromium complex coupling agent, a silane coupling agent, a titanate coupling agent and a zirconium-containing coupling agent.

Next, in step S212, the surface of the composite microsphere is encapsulated with the 3D graphene layer 14. For example, this step may specifically comprise: encapsulating a porous $SiO_2$ surface with the graphene layer, and then performing HF wet etching to obtain 3D graphene powders; and uniformly dispersing the 3D graphene powders through a dispersion liquid, and adding the composite microsphere to the dispersed 3D graphene powders to obtain a composite microsphere encapsulated with the 3D graphene layer 14.

Then, in step S214, the surface of the 3D graphene layer 14 is encapsulated with the metal layer 16. For example, this step may specifically comprise: placing the composite microsphere encapsulated with the 3D graphene layer into a metal layer-forming solution, and under an electrochemical action, forming the metal layer 16 on the surface of the composite microsphere encapsulated by the 3D graphene layer 14 to thereby obtain the electrically conductive particle of the present embodiment.

Figure 2B:
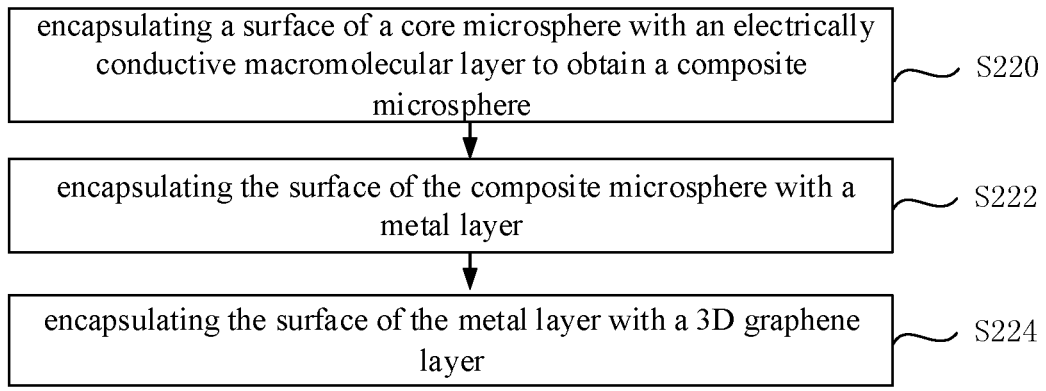
FIG. 2B is a flow chart for manufacturing the electrically conductive particle as shown FIG. 1B according to another illustrative embodiment of the present disclosure.

FIG. 2B is a flow chart for manufacturing the electrically conductive particle as shown in FIG. 1B according to another illustrative embodiment of the present disclosure.

As shown in FIG. 2B, firstly, in step S220, the surface of the core microsphere 10 is encapsulated with the electrically conductive macromolecular layer 12. For example, this step may specifically comprise: treating the core microsphere 10 with a surfactant, and polymerizing electrically conductive monomers on the surface of the core microsphere via initiators to form the electrically conductive macromolecular layer 12, thereby obtaining the composite microsphere.

Next, in step S222, the surface of the composite microsphere is encapsulated with the metal layer 16. For example, this step may specifically comprise: placing the composite microsphere into a metal layer-forming solution, and under an electrochemical action, forming the metal layer 16 on the surface of the composite microsphere to thereby obtain a composite microsphere encapsulated with the metal layer 16.

Next, in step S224, the surface of the metal layer 16 is encapsulated with the 3D graphene layer 14. For example, this step may specifically comprise: encapsulating a porous $SiO_2$ surface with the graphene layer, and then performing HF wet etching to obtain 3D graphene powders; and uniformly dispersing the 3D graphene powders through a dispersion liquid, and adding the composite microsphere encapsulated with the metal layer 16 to the dispersed 3D graphene powders to thereby obtain an electrically conductive particle of the present example.

According to an illustrative embodiment of the present disclosure, there is provided an electrically conductive adhesive comprising the electrically conductive particle as described above.

The type of the electrically conductive adhesive is not specifically limited, and the electrically conductive adhesive may be an isotropic electrically conductive adhesive or an anisotropic electrically conductive adhesive.

According to an illustrative embodiment of the present disclosure, there is provided a method for manufacturing an electrically conductive adhesive, which comprises uniformly distributing the electrically conductive particles in an insulative adhesive material.

Specifically, the electrically conductive particles may be uniformly distributed in the insulative adhesive material in an appropriate ratio. Depending on the requirement and specification of the electrically conductive adhesive, the ratio of the electrically conductive particles to the insulative adhesive material may vary.

The method for manufacturing the electrically conductive particle according to the embodiment of the present disclosure is described below with reference to specific examples. However, it would be understood to those skilled in the art that these examples are disclosed only to illustrate the embodiment of the present disclosure, but shall by no means limit the present disclosure.

EXAMPLE 1

A monodisperse polystyrene microsphere having an average diameter of 2 µm is used as the core microsphere.

The polystyrene microsphere is added into a silane coupling agent (for example, KH-550, etc.) serving as a surfactant, and after a reaction under a condition of oil bath at a temperature of 140° C. for 40 mins, and through centrifugation, a microsphere treated with the surfactant is obtained.

The polystyrene microsphere treated with the surfactant is placed in a hydrochloric acid solution and is magnetically stirred for a period. Then, an aniline monomer serving as an electrically conductive monomer is added dropwise and stirred for a period until the aniline monomer is attached to the surface of the polystyrene microsphere. Subsequently, ammonium persulfate and potassium iodate serving as initiators are added dropwise to cause polymerization of the aniline monomer on the surface of the polystyrene microsphere. At the end of the reaction, a polyaniline electrically conductive layer is formed on the surface of the polystyrene microsphere. The polyaniline electrically conductive layer is controlled between 100 and 500 nm by controlling the amount of the monomer. Hence, a composite microsphere is obtained.

Next, at a temperature of 1100° C. and in an environment of CH4, H2 and Ar, a graphene layer is deposited on the surface of porous $SiO_2$ as a template by chemical vapor deposition (CVD). After being cooled to room temperature, the product is immersed into an HF liquid for an isotropic etching to completely remove the porous $SiO_2$ template and obtain 3D graphene powders. Then, under a condition of 2250° C., the 3D graphene powders are dried and annealed.

Optionally, using the graphene layer obtained above as a template, graphene is further deposited by CVD to obtain 3D graphene having a different thickness according to the need. The conditions may be adjusted according to the desire to obtain 3D graphene layers having different thicknesses.

Here, depending on the shape of the template, such as the porous $SiO_2$ template, the 3D graphene powders may be in a column, sphere or square shape.

Next, the 3D graphene powders are added into an aqueous solution of the surfactant serving as a dispersion liquid (which is a silane coupling agent in this embodiment) for dispersion. After uniformly dispersing the 3D graphene powders in the dispersion liquid, the composite microsphere treated with the surfactant on the surface of the polyaniline layer is added into the dispersing system. And then, a composite microsphere encapsulated with the 3D graphene layer is obtained by centrifugation and filtration. 3D graphene layers having different thicknesses (for example, 500 to 200 nm) may be obtained by controlling the solid content of the graphene in the dispersion liquid.

Next, the composite microsphere encapsulated with the 3D graphene layer is treated with a surfactant (which is a silane coupling agent in this embodiment), and then is placed into a mixed solution as a metal layer-forming solution comprising chloroauric acid (having a mass fraction of 1%) and potassium carbonate of 0.2 mol/L in a volume ratio of 3:1. A direct current electrochemical reaction is performed at room temperature to form a gold layer as a metal layer on the surface of the composite microsphere encapsulated with the 3D graphene layer. By adjusting the reaction conditions, gold layers having different thicknesses (for example, 10 to 100 nm) may be obtained. The electrically conductive particles obtained therefrom are filtered to be extracted from the metal layer-forming solution to thereby obtain the electrically conductive particles as shown in FIG. 1A.

It is understood to those skilled in the art that the specific conditions and parameters used in the respective steps of the present example are just examples. Those skilled in the art may design different conditions and parameters according to the practical need. For example, the surfactant is not limited to a silane coupling agent but can be selected from other surfactants. The metal layer-forming solution is not limited to a mixed solution comprising chloroauric acid (having a mass fraction of 1%) and potassium carbonate of 0.2 mol/L in a volume ratio of 3:1, but can be a mixed solution comprising other components (for example, sodium citrate and chloroauric acid) in another ratio. These are not listed here one by one. Other conditions and parameters that can be envisaged by those skilled in the art after reading the present disclosure shall be deemed to be included in the scope of the present disclosure.

EXAMPLE 2

The present example is the same as the above Example 1 except that the step of encapsulating the 3D graphene layer and the step of encapsulating the gold layer are inverse. Hence, an electrically conductive particle as shown in FIG. 1B is obtained.

EXAMPLE 3

The present example is the same as the above Example 1 except that the material of the core microsphere is polyvinyl chloride. Hence, an electrically conductive particle as shown in FIG. 1A is obtained.

EXAMPLE 4

The present example is the same as the above Example 2 except that the material of the core microsphere is polyvinyl chloride. Hence, an electrically conductive particle as shown in FIG. 1B is obtained.

EXAMPLE 5

The present example is the same as the above Example 1 except that the material of the electrically conductive monomer is a pyrrole monomer. Hence, an electrically conductive particle as shown in FIG. 1A is obtained.

EXAMPLE 6

The present example is the same as the above Example 1 except that the core microsphere is $SiO_2$ and the surfactant is a chromium complex coupling agent. Hence, an electrically conductive particle as shown in FIG. 1A is obtained.

EXAMPLE 7

The present example is the same as the above Example 1 except that the metal layer-forming solution is a silver formaldehyde-silver ammonia solution and a chemical silver plating layer serves as the metal layer.

The reaction formula for the chemical silver plating is as follows:

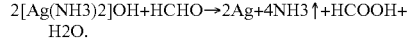

Upon silver plating, the reduction liquid may be firstly poured into an activation fluid carrying a microsphere after activation, and after a complete reaction of the remaining Ag+ in the activation fluid, a silver liquid is added slowly, and a composite microsphere encapsulated with a silver layer is obtained at the end of the reaction.

The embodiment of the present disclosure further provides an electrically conductive adhesive, comprising the electrically conductive particles as described above. The electrically conductive adhesive is manufactured by uniformly distributing the electrically conductive particles in an insulative adhesive material.

As described above, the surface of the core microsphere is encapsulated with an electrically conductive macromolecular layer, and the surface of the electrically conductive macromolecular layer is encapsulated with a 3D graphene layer and a metal layer, thereby forming an electrically conductive particle. Since a 3D graphene layer has a very high compression strength and an electrically conductive macromolecular layer has a high electrical conductivity, the compression strength of the electrically conductive particle can be enhanced while the electrical conductivity of the electrically conductive particle can be maintained. Hence, it is ensured that the electrically conductive adhesive can be used within a wider range of pressure, and the time cost by unit product can be reduced, thereby reducing the cost and enhancing the capacity.

Furthermore, the embodiments of the present disclosure are not limited to the solution of the problem of broken electrically conductive particles during the use of an electrically conductive adhesive, but are also adapted to the problem of broken electrically conductive particles in the electronic field to thereby reduce the repairing rate and production cost and enhance the yield.

The description of the present disclosure gives plenty of details. However, it can be understood that the embodiments of the present disclosure may be practiced without these details. In some examples, well-known methods, structures and techniques are not shown in details in order not to confuse understandings on the present description.

Finally, it is to be noted: the above embodiments are only used to illustrate the technical solutions of the present disclosure but shall by no means limit it; although the present disclosure is demonstrated in details with reference to the above embodiments, those ordinary technicians in the art shall understand that the technical solutions recited in the respective embodiments as mentioned above may be modified, or equivalent substitutions may be made to part of the technical features, and these modifications or substitutions would not cause the essence of the corresponding technical solution to deviate from spirits and scope of the technical solutions of the respective embodiments of the present disclosure.

What is claimed is:

1. An electrically conductive particle, comprising:
a core microsphere;
an electrically conductive macromolecular layer encapsulating the core microsphere; and
a three dimensional (3D) graphene layer and a metal layer, wherein the 3D graphene layer and the metal layer encapsulate the electrically conductive macromolecular layer.

2. The electrically conductive particle according to claim 1, wherein the 3D graphene layer encapsulates the electrically conductive macromolecular layer, and the metal layer encapsulates the 3D graphene layer.

3. The electrically conductive particle according to claim 1, wherein the metal layer encapsulates the electrically conductive macromolecular layer, and the 3D graphene layer encapsulates the metal layer.

4. The electrically conductive particle according to claim 1, wherein the core microsphere is a monodisperse polystyrene microsphere.

5. The electrically conductive particle according to claim 1, wherein the electrically conductive macromolecular layer is a polyaniline layer.

6. The electrically conductive particle according to claim 1, wherein the metal layer is a gold layer.

7. The electrically conductive particle according to claim 1, wherein the core microsphere has an average diameter of 0.1 μm to 10 μm.

8. An electrically conductive adhesive comprising electrically conductive particles according to claim 1.

9. A method for manufacturing an electrically conductive particle, comprising:
   encapsulating a surface of a core microsphere with an electrically conductive macromolecular layer to obtain a composite microsphere; and
   encapsulating the surface of the composite microsphere with a three dimensional (3D) graphene layer and a metal layer.

10. The method according to claim 9, wherein encapsulating the surface of the core microsphere with the electrically conductive macromolecular layer comprises the steps of:
   treating the core microsphere with a surfactant; and
   polymerizing electrically conductive monomers on the surface of the core microsphere via initiators to form an electrically conductive macromolecular layer.

11. The method according to claim 10, wherein encapsulating the surface of the composite microsphere with the 3D graphene layer and the metal layer comprises:
   encapsulating the surface of the composite microsphere with the 3D graphene layer; and
   encapsulating the surface of the 3D graphene layer with the metal layer.

12. The method according to claim 11, wherein encapsulating the surface of the composite microsphere with the 3D graphene layer comprises:
   encapsulating a porous $SiO_2$ surface with the graphene layer, and then performing hydrofluoric acid (HF) wet etching to obtain 3D graphene powders; and
   dispersing the 3D graphene powders, and adding the composite microsphere to the dispersed 3D graphene powders to obtain a composite microsphere encapsulated with the 3D graphene layer.

13. The method according to claim 12, wherein encapsulating the surface of the 3D graphene layer with the metal layer comprises:
   placing the composite microsphere encapsulated by the 3D graphene layer into a metal layer-forming solution, and under an electrochemical action, forming a metal layer on the surface of the composite microsphere encapsulated with the 3D graphene layer to thereby obtain the electrically conductive particle.

14. The method according to claim 10, wherein encapsulating the surface of the composite microsphere with the 3D graphene layer and the metal layer comprises:
   encapsulating the surface of the composite microsphere with the metal layer; and
   encapsulating the surface of the metal layer with the 3D graphene layer.

15. The method according to claim 14, wherein encapsulating the surface of the composite microsphere with the metal layer comprises:
   placing the composite microsphere into a metal layer-forming solution, and under an electrochemical action, forming a metal layer on the surface of the composite microsphere: to thereby obtain a composite microsphere encapsulated with a metal layer.

16. The method according to claim 15, wherein encapsulating the surface of the metal layer with the 3D graphene layer comprises:
   encapsulating a porous $SiO_2$ surface with the graphene layer, and then performing HF wet etching to obtain 3D graphene powders; and
   dispersing the 3D graphene powders, and adding the composite microsphere encapsulated with the metal layer to the dispersed 3D graphene powders to thereby obtain the electrically conductive particle.

17. The method according to claim 9, wherein the core microsphere is a monodisperse polystyrene microsphere.

18. The method according to claim 9, wherein the electrically conductive macromolecular layer is a polyaniline layer.

19. The method according to claim 9, wherein the core microsphere has an average diameter of 0.1 µm to 10 µm.

20. The method according to claim 10, wherein the surfactant is selected from a chromium complex coupling agent, a silane coupling agent, a titanate coupling agent and a zirconium-containing coupling agent.

* * * * *

UNITED STATES PATENT AND TRADEMARK OFFICE
CERTIFICATE OF CORRECTION

PATENT NO. : 11,084,956 B2  
APPLICATION NO. : 15/577205  
DATED : August 10, 2021  
INVENTOR(S) : Haifeng Hu et al.

Page 1 of 1

It is certified that error appears in the above-identified patent and that said Letters Patent is hereby corrected as shown below:

On the Title Page

(73) Assignees, change HEFEI XINSHENG OPTOELECTRONICS TECHNOLOGY CO, LTD to "HEFEI XINSHENG OPTOELECTRONICS TECHNOLOGY CO., LTD."

Signed and Sealed this  
Twenty-first Day of December, 2021

Drew Hirshfeld  
*Performing the Functions and Duties of the*  
*Under Secretary of Commerce for Intellectual Property and*  
*Director of the United States Patent and Trademark Office*